(No Model.)
R. H. HUDGENS & H. R. ALLISON.
SHOVEL PLOW.
No. 296,966. Patented Apr. 15, 1884.
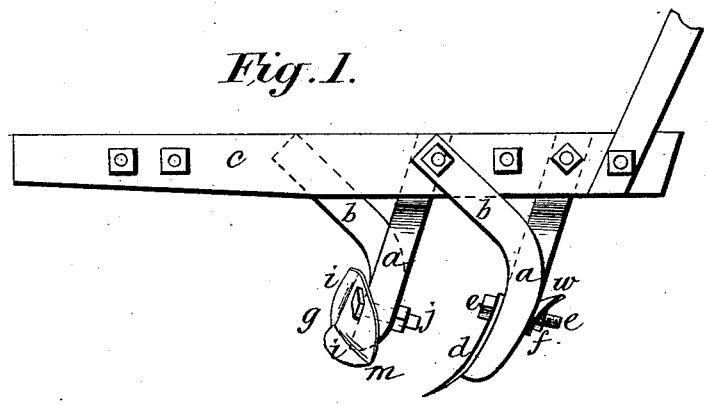
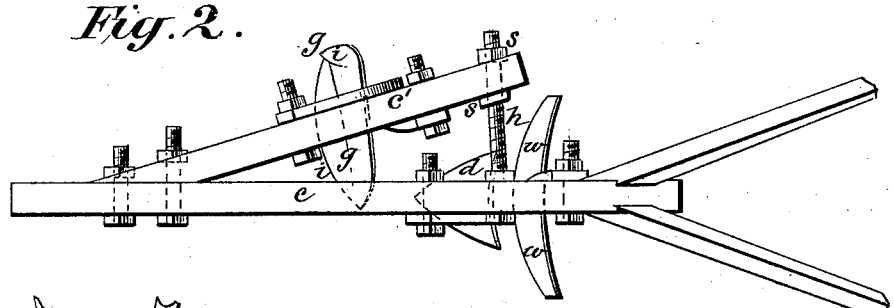
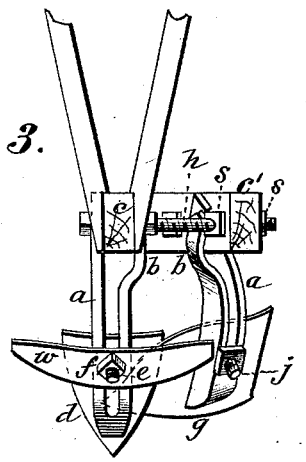
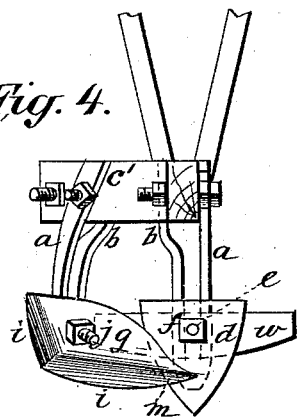
Attest:
Edmund Brodhag
F. L. Browne
Inventors:
Robert H. Hudgens
Henry R. Allison
by Johnson and Johnson
Attys

UNITED STATES PATENT OFFICE.

ROBERT H. HUDGENS AND HENRY R. ALLISON, OF LAURENS COURT-HOUSE, SOUTH CAROLINA.

SHOVEL-PLOW.

SPECIFICATION forming part of Letters Patent No. 296,966, dated April 15, 1884.

Application filed October 31, 1883. (No model.)

*To all whom it may concern:*

Be it known that we, ROBERT H. HUDGENS and HENRY R. ALLISON, citizens of the United States, residing at Laurens Court-House, in the county of Laurens and State of South Carolina, have invented new and useful Improvements in Shovel-Plows, of which the following is a specification.

We have improved the class of shovel-plows particularly adapted for "siding" or cultivating cotton, in which the beam carries a single shovel. We provide the standard carrying this single shovel with a bow-scraper, placed just behind the top of the shovel and secured to the rear side of the standard by the same bolt which secures the shovel, for the purpose of leveling the fresh dirt thrown to the plants by the shovel. A scraper of peculiar form is carried by a second beam in advance of the shovel for the purpose of cutting the dirt and grass from the plants and throwing it in front of the shovel. This scraper is formed somewhat similar in general outline to the pointed shovel—that is, it has a wide end and curved sides, which taper to a point; but instead of the blade being curved in the direction of its length, as is the shovel, its body is substantially straight, and it is arranged with the point toward the shovel and its widest end toward the plants. A portion of its lower edge and wide end are also bent or turned at an angle with the body of the scraper and sharpened to form cutting-edges, and it is secured to its standard so that it inclines at right angles to the line of draft toward the shovel of the main beam, to throw the grass and dirt away from the plants. This scraper is set so as to cut along the surface, while the shovel plows deeper, and the cutting-edge formed along the end and bottom of the scraper-blade is curved from the top to the bottom edge and from the wide end to the point, so as to present a shearing cut.

The improvement consists in the construction and combination of the parts hereinafter described and claimed.

In the accompanying drawings, Figure 1 represents a side view, Fig. 2 a top view, Fig. 3 a rear view, and Fig. 4 a front view, of a shovel-plow embracing our invention.

The standards $a$ are of strap-iron, bent so as to leave a space between them, and secured to their respective beams, with one part, $b$, bent forward to form a brace to sustain the standard against the pressure of the plows. The standard of the main beam $c$ has a shovel-plow, $d$, secured to it by a bolt, $e$, passing through the space between the standards and fastened by a nut, $f$. A bow-scraper, $w$, is secured to the rear side of this standard by the same bolt $f$ and nut $e$ which secures the shovel-plow, so that the scraper is arranged just behind the top of the shovel-plow in a horizontal position, and is of a length to extend beyond each side of the shovel, so as to scrape and level the earth thrown up by the shovel along each row of plants. In setting the shovel-plow down upon the standard as the shovel wears away at the point, the bow-scraper is also set down. This scraper has a bow or crescent shape, and is curved, so as to throw the earth away from each end while leveling the ridges thrown up by the plow.

The standard of the second beam $c'$ carries a scraper, $g$, of a somewhat similar form in general outline to that of the shovel-plow, but having a substantially straight body, instead of curved and secured with its point $m$ toward the shovel-plow and its widest end next the row of plants. A portion of the lower edge and the wide end of this scraper-blade are turned or bent at an angle with the body, so as to form projecting flanges $i$, which, when sharpened, form cutting-edges to the scraper, and to render the cutting action effective the cutting-edges of the projecting flanges are curved, as shown in Figs. 1 and 4—that is, the edge of the side flange curves outward between the top and bottom edges and the bottom flange curves outward between the wide end and point, and the scraper-blade is placed upon the standard, so as to incline obliquely across the line of draft to cut and throw the grass and earth away from the row of plants. This scraper is secured by a bolt, $j$, to the standard in the same manner as the shovel-plow, and can be set down as it wears away at the cutting-edge. The flange at the wide end of the scraper-blade, in addition to that of cutting the earth and grass, also acts as a shield to the plants, and permits of the cultivator being run very close to the plants, and this end of the scraper is inclined inward from the top to the bottom edge, as shown in Fig. 4—that is, the lower corner of the side of the blade is more remote from the top edge, so that injury to the roots of the plants by too close running of the blade to them is avoided. The beam which carries it is bolted to the front end of the main beam, and this second beam is secured at its rear end to the main beam by a screw-bolt, $h$, upon which the said second beam can be adjusted by the nuts $s$ $s$, so as to set the beam to bring the point of the front scraper to lap more or less the path of the shovel-plow. This construction and combination gives a front scraper for clearing the grass and loosening the earth along one side of a row, a shovel-plow for plowing in the middle between the rows of plants, and a rear bow-scraper for leveling the earth thrown up by the shovel-plow.

We claim—

The combination, in a cultivator-plow, with the main beam $c$, angularly-placed adjustable beam $c'$, and bracing-standards $a$ $b$, of the shovel $d$, the bow-scraper $w$, secured upon the rear standard, as described, and scraper $g$ $m$, having side and bottom cutting-flanges, $i$ $i$, secured to the forward standard, all constructed and arranged substantially as shown, and for the purpose described.

In testimony whereof we have hereunto set our hands in the presence of two subscribing witnesses.

ROBERT H. HUDGENS.
H. R. ALLISON.

Witnesses:
JAMES FARROW,
G. M. LANGSTON.